United States Patent
Yamashita et al.

(10) Patent No.: US 10,570,217 B2
(45) Date of Patent: Feb. 25, 2020

(54) HYDROXYPROPYL METHYL CELLULOSE HAVING HIGH THERMAL GEL STRENGTH, METHOD FOR PRODUCING THE SAME, AND FOOD CONTAINING THE SAME

(71) Applicant: Shin-Etsu Chemical Co., Ltd., Tokyo (JP)

(72) Inventors: Tatsuya Yamashita, Joetsu (JP); Akira Kitamura, Joetsu (JP); Atsushi Yamamoto, Joetsu (JP); Mitsuo Narita, Joetsu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 15/452,894

(22) Filed: Mar. 8, 2017

(65) Prior Publication Data
US 2017/0267786 A1    Sep. 21, 2017

(30) Foreign Application Priority Data

Mar. 15, 2016 (JP) ................................ 2016050945

(51) Int. Cl.
| | |
|---|---|
| C08B 11/00 | (2006.01) |
| C08B 11/193 | (2006.01) |
| C08B 1/08 | (2006.01) |
| C08B 11/08 | (2006.01) |
| C08L 1/28 | (2006.01) |
| A23L 29/262 | (2016.01) |
| A23L 33/10 | (2016.01) |
| A23L 29/288 | (2016.01) |

(52) U.S. Cl.
CPC .......... *C08B 11/193* (2013.01); *A23L 29/262* (2016.08); *A23L 29/288* (2016.08); *A23L 33/10* (2016.08); *C08B 1/08* (2013.01); *C08B 11/08* (2013.01); *C08L 1/28* (2013.01); *C08L 1/284* (2013.01); *A23V 2002/00* (2013.01)

(58) Field of Classification Search
CPC .......... C08B 11/00; C08B 11/193; A23L 29/00
USPC ............................................ 536/91, 95, 126
See application file for complete search history.

(56) References Cited

U.S. PATENT DOCUMENTS

| | | | | |
|---|---|---|---|---|
| 4,511,497 | A * | 4/1985 | Ehrlich | B01F 17/0085 510/433 |
| 4,614,545 | A * | 9/1986 | Hess | C08B 11/193 106/173.01 |
| 5,476,668 | A * | 12/1995 | Kobayashi | A61K 9/2866 424/488 |
| 9,580,581 | B2 * | 2/2017 | Adden | C08L 1/28 |
| 2004/0136924 | A1 * | 7/2004 | Boyd | A61K 8/042 424/48 |
| 2011/0144322 | A1 | 6/2011 | Itoh et al. | |
| 2012/0214981 | A1 | 8/2012 | Narita | |
| 2013/0236512 | A1 | 9/2013 | Adden et al. | |
| 2013/0245249 | A1 | 9/2013 | Itoh et al. | |
| 2014/0194618 | A1 | 7/2014 | Narita et al. | |

FOREIGN PATENT DOCUMENTS

| | | |
|---|---|---|
| JP | 2011-144350 A | 7/2011 |
| JP | 2012172037 | 9/2012 |
| JP | 2013-539815 A | 10/2013 |
| JP | 2014148668 | 8/2014 |
| WO | WO 2012/051035 A1 | 4/2012 |

OTHER PUBLICATIONS

Office Action corresponding to Japanese Application No. 2016-050945 dated Jan. 25, 2019.

* cited by examiner

*Primary Examiner* — Shaojia A Jiang
*Assistant Examiner* — Everett White
(74) *Attorney, Agent, or Firm* — Myers Bigel, P.A.

(57) ABSTRACT

Hydroxypropyl methyl cellulose having a high thermal gel strength even at a low viscosity is provided and utilized. Specifically provided is hydroxypropyl methyl cellulose having such properties that a 2% by weight aqueous solution of the hydroxypropyl methyl cellulose has a viscosity at 20° C. of 300 to 2,000 mPa·s and a storage elastic modulus at 85° C. of 2,000 to 4,500 mPa. Also provided is a food comprising the hydroxypropyl methyl cellulose. Further provided is a method for producing the hydroxypropyl methyl cellulose, the method comprising a step of depolymerizing, with an acid, high-viscosity hydroxypropyl methyl cellulose having such a property that a 2% by weight aqueous solution of the high-viscosity hydroxypropyl methyl cellulose has a viscosity at 20° C. of 70,000 to 100,000 mPa·s to obtain the hydroxypropyl methyl cellulose.

10 Claims, No Drawings

HYDROXYPROPYL METHYL CELLULOSE HAVING HIGH THERMAL GEL STRENGTH, METHOD FOR PRODUCING THE SAME, AND FOOD CONTAINING THE SAME

RELATED APPLICATION

This application claims priority from Japanese Patent Application No. 2016-050945, filed Mar. 15, 2016, the disclosures of which is incorporated by reference herein in its entirety.

FIELD OF THE INVENTION

The present invention relates to hydroxypropyl methyl cellulose having a high thermal gel strength, a method for producing the hydroxypropyl methyl cellulose, and a food containing the hydroxypropyl methyl cellulose.

BACKGROUND OF THE INVENTION

Cellulose ethers such as methyl cellulose and hydroxypropyl methyl cellulose have such thermoreversible gelation properties as to undergo gelation during heating, and are used in processed foods to improve the shape retention of a heated foods by taking advantage of the thermoreversible gelation properties.

The methyl cellulose has a higher thermal gel strength than that of the hydroxypropyl methyl cellulose, but a thermal gelation temperature of a 2% by weight aqueous solution of the methyl cellulose is as low as about 50 to 60° C. so that the methyl cellulose is still in a gel state at the food temperature of 50 to 70° C. during eating, and has a possibility of providing hard texture. In addition, the methyl cellulose has to be once cooled at 15° C. or lower for complete dissolution in preparation of a solution thereof, thereby making the preparation complicated.

The hydroxypropyl methyl cellulose has a relatively higher thermal gelation temperature of 61 to 80° C. than that of the methyl cellulose, and the thermal gelation temperature can be adjusted to 70° C. or higher by controlling the substitution degree. Thus, the hydroxypropyl methyl cellulose has a lower possibility of providing hard texture. Since the hydroxypropyl methyl cellulose can be dissolved at 25° C. or higher, no cooling operation is required in preparation of a solution thereof, thereby making the preparation simple. For these reasons, the hydroxypropyl methyl cellulose having a high thermal gelation temperature is preferred to improve the shape retention of a food during heating in absence of providing hard texture.

When added to a food, hydroxypropyl methyl cellulose having a low viscosity is preferred from the standpoint of operability. Since the thermal gel strength of hydroxypropyl methyl cellulose is variable greatly depending on the viscosity thereof, however, high shape retention requires a high viscosity, thereby resulting in poor operability. On this account, there is a demand for the hydroxypropyl methyl cellulose having a high thermal gel strength even at a low viscosity.

As the method for producing hydroxypropyl methyl cellulose having a high thermal gel strength, a production method in which a cellulose is alkalized in at least two steps as described in JP 2013-539815T, which is a Japanese phase publication of WO 2012/051035, and a production method in which a methyl etherifying agent is reacted prior to a hydroxypropyl etherifying agent as described in JP 2011-144350A are known.

SUMMARY OF THE INVENTION

The hydroxypropyl methyl cellulose disclosed in JP 2013-539815T has a greatly higher thermal gel strength than those of conventional hydroxypropyl methyl celluloses but has a greatly lower thermal gelation temperature. Accordingly, the hydroxypropyl methyl cellulose is still in a gel state during eating and has possibility of providing hard texture. The hydroxypropyl methyl cellulose disclosed in JP 2011-144350A has a higher thermal gel strength but is still required to have further enhancement of the thermal gel strength to increase the shape retention of a food.

An object of the present invention is to provide hydroxypropyl methyl cellulose having a high thermal gel strength even at a low viscosity and to utilize it.

As a result of intensive studies for achieving the object, the inventors have found that hydroxypropyl methyl cellulose having a high thermal gel strength even at a low viscosity can be produced, and have completed the present invention.

In one aspect of the invention, there is provided hydroxypropyl methyl cellulose having such properties that a 2% by weight aqueous solution of the hydroxypropyl methyl cellulose has a viscosity at 20° C. of 300 to 2,000 mPa·s and a storage elastic modulus at 85° C. of 2,000 to 4,500 mPa. In another aspect of the invention, there is provided a food comprising the hydroxypropyl methyl cellulose. In still another aspect of the invention, there is provided a method for producing the hydroxypropyl methyl cellulose, comprising the step of: depolymerizing, with an acid, high-viscosity hydroxypropyl methyl cellulose having such a property that a 2% by weight aqueous solution of the high-viscosity hydroxypropyl methyl cellulose has a viscosity at 20° C. of 70,000 to 100,000 mPa·s to obtain the intended hydroxypropyl methyl cellulose.

According to the present invention, hydroxypropyl methyl cellulose having a high thermal gel strength even at a low viscosity can be produced. Thus, in preferable embodiment of using the hydroxypropyl methyl cellulose as a food additive, a food having excellent shape retention can be produced during heating.

DETAILED DESCRIPTION OF THE PREFERRED EMBODIMENTS

The present invention now will be described more fully hereinafter in which embodiments of the invention are provided with reference to the accompanying drawings. This invention may, however, be embodied m many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

A 2% by weight aqueous solution of the hydroxypropyl methyl cellulose has a viscosity at 20° C. of 300 to 2,000 mPa·s, preferably 500 to 2,000 mPa·s. When the viscosity of the 2% by weight aqueous solution is less than 300 mPa·s, an insufficient thermal gel strength is achieved. When the viscosity is more than 2,000 mPa·s, the aqueous solution has an excessively high viscosity so that operability becomes poor.

The viscosity can be determined by using a Brookfield viscometer in accordance with the analytical method for hydroxypropyl methyl cellulose in the Japanese Pharmacopoeia Sixteenth Edition.

A 2% by weight aqueous solution of the hydroxypropyl methyl cellulose has a storage elastic modulus G' (85° C.) at 85° C. of 2,000 to 4,500 mPa, preferably 2,000 to 4,000 mPa. The G' is the sign indicating the storage elastic modulus of a 2% by weight aqueous solution of hydroxypropyl methyl cellulose. When the storage elastic modulus G' (85° C.) at 85° C. of a 2% by weight aqueous solution is less than 2,000 mPa, such hydroxypropyl methyl cellulose is insufficient to improve the shape retention of a food. When the storage elastic modulus G' (85° C.) is more than 4,500 mPa, a resulting gel is excessively hard and has no elasticity so that cracks may be observed on a food after heating.

The storage elastic modulus G' (85° C.) at 85° C. of a 2% by weight aqueous solution of hydroxypropyl methyl cellulose may be determined with a rheometer such as MCR 500 manufactured by Anton Paar.

The storage elastic modulus G' (50 to 85° C.) may be measured by a method comprising the steps of: adjusting a temperature of the sample-measurement-section of a rheometer to 50° C. in advance; pouring a 2% by weight aqueous solution of hydroxypropyl methyl cellulose in a CC27 measurement cup, which is a cylindrical aluminum container having a diameter of 30 mm and a height of 80 mm, to a marked line (25 ml); applying a distortion with a vibration amplitude of 5% at the frequency of 1 Hz to start the measurement; and increasing the temperature of the sample-measurement-section by 1° C. per minute to 85° C. to collect the data at a point per minute. The obtained storage elastic modulus G' (50 to 85° C.) generally represents the elastic factor of a solution. On the other hand, the loss elastic modulus G"(50 to 85° C.) generally represents the viscous factor of a solution, or a factor of such characteristics that a fluid is deformed by fluid movement to generate resistance, and is an index of gelation temperature. In the specification, the storage elastic modulus G' (85° C.) at the time when the temperature reaches 85° C. is regarded as the storage elastic modulus at 85° C. of a 2% by weight aqueous solution.

The hydroxypropyl methyl cellulose preferably has a thermal gelation temperature of 70° C. or more, more preferably 70 to 85° C., even more preferably 73 to 85° C. from the standpoint of texture or shape retention of a food. The thermal gelation temperature is a temperature at the time when a ratio of storage elastic modulus G' to loss elastic modulus G" becomes equal to one (G'/G"=1) in the rheometer measurement of a 2% by weight aqueous solution of hydroxypropyl methyl cellulose.

From the standpoint of solubility, a thermal gelation temperature and thermal gel strength, the hydroxypropyl methyl cellulose has an average degree of substitution (DS) of methoxy group per glucose unit of preferably 1.0 to 2.0, more preferably 1.3 to 1.6 and an average molar substitution (MS) of hydroxypropoxy group of preferably 0.05 to 0.4, more preferably 0.1 to 0.3, even more preferably 0.2 to 0.3.

The average degree of substitution of methoxy group and the average molar substitution of hydroxypropoxy group can be determined by the analytical methods for methyl cellulose in the Japanese Pharmacopoeia Sixteenth Edition.

The content of the hydroxypropyl methyl cellulose in a food is preferably 0.1 to 5% by weight, more preferably 02 to 2% by weight, from the standpoint of texture or shape retention of the food. The food includes foods and drinks and also includes seasonings such as sugar, salt, pepper and baking powder.

The food containing the hydroxypropyl methyl cellulose is exemplified by a food which requires heating at a temperature higher than the thermal gelation temperature of the hydroxypropyl methyl cellulose and preferably maintaining the shape during the heating as a result of gelation of the hydroxypropyl methyl cellulose. Specific examples of the food include heat-processed foods such as molded potato, onion rings, croquettes, doughnuts and bread and food materials to be processed including frozen foods requiring heating, such as filling and batter.

Next, the method for producing hydroxypropyl methyl cellulose will be described.

In the specification, the high-viscosity hydroxypropyl methyl cellulose means hydroxypropyl methyl cellulose before depolymerization unless otherwise noted. A 2% by weight aqueous solution of the high-viscosity hydroxypropyl methyl cellulose as the raw material preferably has a viscosity at 20° C. of 70,000 to 100,000 mPa·s, preferably 80,000 to 100,000 mPa·s, even more preferably 90,000 to 100,000 mPa·s. When the viscosity is less than 70,000 mPa·s, depolymerized hydroxypropyl methyl cellulose will have an insufficient thermal gel strength. When the viscosity is more than 100,000 mPa·s, usable pulp is limited and the depolymerization has to be carried out in more severe conditions, resulting in poor economic efficiency in industrial production.

The viscosity may be determined by using a Brookfield viscometer in accordance with the analytical method for hydroxypropyl methyl cellulose in the Japanese Pharmacopoeia Sixteenth Edition.

The hydroxypropyl methyl cellulose to be depolymerized may be prepared by any method as long as the above viscosity is satisfied, and may be prepared by the method comprising the steps of: bringing a pulp into contact with an alkali metal hydroxide to obtain alkali cellulose and then reacting the alkali cellulose with an etherifying agent. The type of pulp for providing starting material cellulose may be wood pulp or linter pulp.

In the depolymerization method, an acid, an alkali or an enzyme may be used. From the standpoint of economy and workability, the depolymerization with an acid is preferred.

The acid may be in a gas, liquid, or solution state and may be any type as long as a solution of the acid donates protons. Typically, hydrogen chloride gas, an aqueous solution thereof, or an alcohol solution thereof may be used. When an acid is used for hydrolysis, the acid is preferably removed by degassing after the reaction.

For example, when hydrogen chloride is used, the amount of the acid to be added is preferably in a range of 0.04 to 1% by weight relative to the high-viscosity hydroxypropyl methyl cellulose. When the amount is less than 0.04% by weight, it takes a long time to complete the depolymerization reaction. When the amount is more than 1% by weight, the depolymerization reaction is difficult to control, it takes a long time to remove the acid, and a large amount of the acid is likely to be present as an impurity in a product.

When an acid is used, the reaction temperature is preferably 40 to 100° C., more preferably 60 to 90° C. to appropriately control the reaction rate. The reaction time varies with temperatures but is preferably 30 to 150 minutes.

A viscosity reduction ratio by depolymerization means a ratio (%) obtained by dividing the difference between the viscosity of a polymer before depolymerization and the viscosity of the depolymerized polymer by the viscosity of the polymer before depolymerization, and is preferably 97% or more, more preferably 97.5 to 99.6% from the standpoint of thermal gel strength or operability.

The present invention will next be described in further detail with reference to Examples and Comparative Examples. It should not be construed that the invention is limited to or by Examples.

EXAMPLES

Example 1

(Process of Producing Hydroxypropyl Methyl Cellulose from Pulp)

A wood pulp having a polymerization degree of 5500 was pulverized with a pulverizer to obtain a cellulose pulp powder. The cellulose pulp powder in an amount corresponding to 3000 g of cellulose component was placed in a 50-L internal-stirring pressure-resistant reactor with a jacket, and the reactor was vacuumed to −95 kPa and purged with nitrogen to 0 kPa three times.

Next, while keeping the inside temperature of the reactor at 60° C., 1200 g of dimethyl ether and 3930 g of a 49% by weight aqueous sodium hydroxide solution were added to the reactor and the resulting mixture was stirred for 20 minutes.

Subsequently, the inside temperature of the reactor was increased from 60° C. to 90° C. over 90 minutes, and during the temperature increase, 3405 g of methyl chloride and 798 g of propylene oxide were added to the reactor. After the inside temperature reached 90° C., the mixture was reacted at 90° C. for 30 minutes to complete the etherification reaction.

The resulting reaction mixture was washed with hot water of 95° C., then dried at 80° C., and pulverized with a compact Wiley mill. The obtained high-viscosity hydroxypropyl methyl cellulose had a DS of 1.49 and an MS of 0.25, and a 2% by weight aqueous solution thereof had a viscosity at 20° C. of 92900 mPa·s.

(Process of Depolymerizing High-Viscosity Hydroxypropyl Methyl Cellulose)

The 1 kg of the high-viscosity hydroxypropyl methyl cellulose was placed in a Henschel mixer with a capacity of 20 L, and subjected to spraying of 4 g of 14% by weight hydrochloric acid while the reactor being stirred at 200 rpm. The 50 g of the resulting hydrochloric acid mixture was transferred into a 500-ml glass reactor for the depolymerization reaction for 60 minutes, while rotating and heating the reactor in a water bath of 80° C. While the reactor temperature was maintained at 80° C., the reactor was vacuumed to 60 mmHg to evaporate the hydrogen chloride and water over 60 minutes.

A 2% by weight aqueous solution of the resulting HPMC had a viscosity at 20° C. of 1980 mPa·s as shown in Table 1, and the viscosity reduction ratio was (1−1,980/92,900)× 100=97.9%.

The storage elastic modulus G' (85° C.) at 85° C. was 3414 mPa, and the thermal gelation temperature was 77° C.

Example 2

The depolymerization reaction was carried out in the same manner as in Example 1 except that the depolymerization reaction time was changed from 60 minutes to 90 minutes. The results are shown in Table 1.

Example 3

The depolymerization reaction was carried out in the same manner as in Example 1 except that the depolymerization reaction time was changed from 60 minutes to 120 minutes. The results are shown in Table 1.

Example 4

High-viscosity hydroxypropyl methyl cellulose is obtained in the same manner as in Example 1 except that a wood pulp having a polymerization degree of 4500 was used. The obtained high-viscosity hydroxypropyl methyl cellulose had a DS of 1.49 and an MS of 0.25, and a 2% by weight aqueous solution thereof had a viscosity at 20° C. of 70200 mPa·s. The depolymerization reaction was carried out in the same manner as in Example 1 except that the obtained high-viscosity hydroxypropyl methyl cellulose was depolymerized. The results are shown in Table 1.

Example 5

The depolymerization reaction was carried out in the same manner as in Example 4 except that the reactor was rotated and heated in a water bath of 70° C. for the depolymerization reaction for 60 minutes. The results are shown in Table 1.

Comparative Example 1

The depolymerization reaction was carried out in the same manner as in Example 1 except that the depolymerization reaction time was changed from 60 minutes to 240 minutes. The results are shown in Table 1.

Comparative Example 2

High-viscosity hydroxypropyl methyl cellulose was obtained in the same manner as in Example 1 except that a wood pulp having a polymerization degree of 4,300 was used. The obtained high-viscosity hydroxypropyl methyl cellulose had a DS of 1.47 and an MS of 0.26, and a 2% by weight aqueous solution thereof had a viscosity at 20° C. of 66400 mPa·s. The depolymerization reaction was carried out in the same manner as in Example 1 except that the obtained high-viscosity hydroxypropyl methyl cellulose was depolymerized. The results are shown in Table 1.

Comparative Example 3

High-viscosity hydroxypropyl methyl cellulose was obtained in the same manner as in Example 1 except that a wood pulp having a polymerization degree of 1,500 was used and the reactor was vacuumed and purged with nitrogen only once instead of three times. The obtained high-viscosity hydroxypropyl methyl cellulose had a DS of 1.45 and an MS of 0.24 and a 2% by weight aqueous solution thereof had a viscosity at 20° C. of 1254 mPa·s. The high-viscosity hydroxypropyl methyl cellulose was not depolymerized, and was subjected to measurement of storage elastic modulus and others with a rheometer. The results are shown in Table 1.

Comparative Example 4

By the method of alkalization of cellulose in two steps as described in JP 2013-539815T, which is a Japanese phase publication of WO 2012/051035, hydroxypropyl methyl cellulose was produced from a wood pulp.

More specifically, a wood pulp having a polymerization degree of 1500 was pulverized with a pulverizer to obtain a cellulose pulp powder. The cellulose pulp powder in an amount corresponding to 3000 g of cellulose component was placed in a 50-L internal-stirring pressure-resistant reactor with a jacket, and the reactor was vacuumed to −95 kPa and purged with nitrogen to 0 kPa once.

Next, while keeping the inside temperature of the reactor at 40° C., 1200 g of dimethyl ether and 1889 g of a 49% by weight aqueous sodium hydroxide solution were added to the reactor and the resulting mixture was stirred for 30 minutes.

Subsequently, while keeping the inside temperature of the reactor at 40° C., 3273 g of methyl chloride and 657 of propylene oxide were added thereto over 10 minutes, and then the inside temperature of the reactor was increased from 40° C. to 80° C. over 60 minutes. After the inside temperature reached 80° C., the mixture was reacted at 80° C. for 30 minutes, and 1,511 g of a 49% by weight aqueous sodium hydroxide solution was added thereto at 80° C. over 90 minutes. After the completion of the addition, the inside temperature of the reactor was increased from 80° C. to 90° C. over 20 minutes. After the inside temperature reached 90° C., the mixture, was reacted at 90° C. for 40 minutes to complete the etherification.

The resulting reaction mixture was washed with hot water of 95° C., then dried at 80° C., and pulverized with a compact Wiley mill. The obtained high-viscosity hydroxypropyl methyl cellulose had a DS of 1.49 and an MS of 0.28, and a 2% by weight aqueous solution thereof had a viscosity at 20° C. of 1069 mPa·s. The hydroxypropyl methyl cellulose was not depolymerized, and was subjected to measurement of storage elastic modulus and others with a rheometer. The results are shown in Table 1.

Example 6

The 5.0 g of the depolymerized hydroxypropyl methyl cellulose produced in Example 1 was mixed thoroughly with 6.0 g of sodium chloride and 6.0 g of pepper.

Separately, potatoes were peeled, boiled and mashed. The hydroxypropyl methyl cellulose mixed with the salt and the pepper was added to 1.0 kg of the mashed potato at 80° C., and thoroughly mixed to obtain a smooth and homogeneous mixture.

After the mixing, the mixture was divided into pieces each having a weight of 20 g. The pieces were molded with a star-shaped metal mold to obtain 50 molded potato pieces. The molded potato pieces were cooked with oil at 180° C. for 3 minutes. After cooking, the molded potato pieces of 60° C. were eaten to find the fluffy potato texture. Of 50 molded potato pieces, 48 pieces maintained the star shapes without a surface crack.

Comparative Example 5

The molded potato pieces cooked with oil was obtained in the same manner as in Example 6 except that the hydroxypropyl methyl cellulose produced in Comparative Example 3 was used. After cooking, the molded potato pieces of 60° C. were eaten to find the fluffy potato texture. Of 50 molded potato pieces, only 35 pieces maintained the star shapes without a surface crack. Specifically, many molded potato pieces failed to maintain the star shapes.

Comparative Example 6

The molded potato pieces cooked with oil was obtained in the same manner as in Example 6 except that the hydroxypropyl methyl cellulose produced in Comparative Example 4 was used. After cooking, the molded potato pieces of 60° C. were eaten to find harder texture than those in Example 6 and Comparative Example 5 and find no fluffy potato texture. Of 50 molded potato pieces, 41 pieces maintained the star shapes without a surface crack. Specifically, many molded potato pieces had cracks on the surfaces.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. Hydroxypropyl methyl cellulose having a viscosity at 20° C. of 300 to 2,000 mPa·s and a storage elastic modulus

TABLE 1

| | high-viscosity hydroxypropyl methyl cellulose | | | depolymerized hydroxypropyl methyl cellulose (not depolymerized in Comparative Examples 3 and 4) | | | | | |
|---|---|---|---|---|---|---|---|---|---|
| | | | viscosity at 20° C. of | depolymerization conditions *1 | | vicosity at 20° C. of | viscosity reduction | storage elastic modulus at 85° C. | thermal gelation temperature at |
| | DS | MS | aq. solution (mPa · s) | temp (° C.) | time (min) | aq. solution (mPa · s) | ratio (%) | G'(85° C.) (mPa) | G'/G° = 1 (° C.) |
| Example1 | 1.49 | 0.25 | 92900 | 80 | 60 | 1980 | 97.9 | 3414 | 77 |
| Example2 | 1.49 | 0.25 | 92900 | 80 | 90 | 547 | 99.4 | 2653 | 74 |
| Example3 | 1.49 | 0.25 | 92900 | 80 | 120 | 373 | 99.6 | 2050 | 73 |
| Example4 | 1.49 | 0.25 | 70200 | 80 | 60 | 812 | 98.8 | 2528 | 75 |
| Example5 | 1.49 | 0.25 | 70200 | 70 | 60 | 1878 | 98.5 | 3362 | 77 |
| Comp. Ex. 1 | 1.49 | 0.25 | 92900 | 80 | 240 | 105 | 99.9 | 656 | 73 |
| Comp. Ex. 2 | 1.47 | 0.26 | 66400 | 80 | 60 | 549 | 99.2 | 730 | 74 |
| Comp. Ex. 3 | 1.45 | 0.24 | 1254 | absence of depolymerization | | — | — | 1039 | 79 |
| Comp. Ex. 4 | 1.49 | 0.28 | 1069 | polymerization | | — | — | $2.7 \times 10^8$ *2 | 41 *2 |

*1 An amount of HCl added was 0.056% by weight relative to the hydroxypropyl methyl cellulose.
*2 The temperature of the sample-measurement-section of the rheometer was adjusted to 20° C. in advance and then increased at a rate of 1° C./min to 90° C.

at 85° C. of 2,000 to 4,500 mPa as determined in a 2% by weight aqueous solution thereof.

2. The hydroxypropyl methyl cellulose according to claim 1, having a thermal gelation temperature of 70° C. or more.

3. The hydroxypropyl methyl cellulose according to claim 2, having an average degree of substitution (DS) of methoxy group per glucose unit of 1.0 to 2.0 and an average molar substitution (MS) of hydroxypropoxy group per glucose unit of 0.05 to 0.4.

4. A food comprising the hydroxypropyl methyl cellulose of claim 3.

5. A food comprising the hydroxypropyl methyl cellulose of claim 2.

6. The hydroxypropyl methyl cellulose according to claim 1, having an average degree of substitution (DS) of methoxy group per glucose unit of 1.0 to 2.0 and an average molar substitution (MS) of hydroxypropoxy group per glucose unit of 0.05 to 0.4.

7. A food comprising the hydroxypropyl methyl cellulose of claim 3.

8. A food comprising the hydroxypropyl methyl cellulose of claim 1.

9. A method for producing the hydroxypropyl methyl cellulose of claim 1, the method comprising:
depolymerizing high-viscosity hydroxypropyl methyl cellulose with an acid to obtain the hydroxypropyl methyl cellulose of claim 1, wherein the high-viscosity hydroxypropyl methyl cellulose has a viscosity at 20° C. of 70,000 to 100000 mPa·s as determined in a 2% by weight aqueous solution thereof.

10. The method according to claim 9, wherein a viscosity reduction ratio in depolymerizing step is 97% or more.

* * * * *

UNITED STATES PATENT AND TRADEMARK OFFICE
CERTIFICATE OF CORRECTION

PATENT NO. : 10,570,217 B2
APPLICATION NO. : 15/452894
DATED : February 25, 2020
INVENTOR(S) : Yamashita et al.

Page 1 of 1

It is certified that error appears in the above-identified patent and that said Letters Patent is hereby corrected as shown below:

In the Specification

Column 4, Line 4: Please correct "02" to read -- 0.2 --

Column 7, Line 16: Please correct "657" to read -- 657 g --

Column 8, Line 45, Table 1: Please correct "G'/G° = 1" to read -- G'/G" = 1 --

In the Claims

Column 9, Line 20, Claim 7: Please correct "of claim 3." to read -- of claim 6. --

Column 9, Line 32, Claim 10: Please correct "in depolymerizing" to read -- in the depolymerizing --

Signed and Sealed this
Ninth Day of June, 2020

Andrei Iancu
*Director of the United States Patent and Trademark Office*